Dec. 3, 1929.   E. P. COLLINS   1,737,570

LUBRICATOR

Filed May 25, 1928

E. P. Collins, Inventor

By C. A. Snow & Co.

Attorneys

Patented Dec. 3, 1929

1,737,570

UNITED STATES PATENT OFFICE

EVERETT P. COLLINS, OF CHILLICOTHE, OHIO

LUBRICATOR

Application filed May 25, 1928. Serial No. 280,606.

This invention relates to lubricators, and more particularly lubricators of the force feed type, the primary object of the invention being to provide a lubricator having a plurality of pipes leading therefrom and connected with the bearings of the machinery with which the device is used, so that the lubricant will be constantly fed to the bearings.

An important object of the invention is to provide a lubricator including a cylindrical body portion for containing the lubricant which is in the form of heavy grease, and a follower movable longitudinally of the cylinder for forcing the lubricant from the cylindrical body portion.

A still further object of the invention is to provide a cylindrical body portion having a plurality of outlet nozzles, and valves for normally closing the nozzles, novel means being provided for opening the valves to allow the lubricant to pass therefrom.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
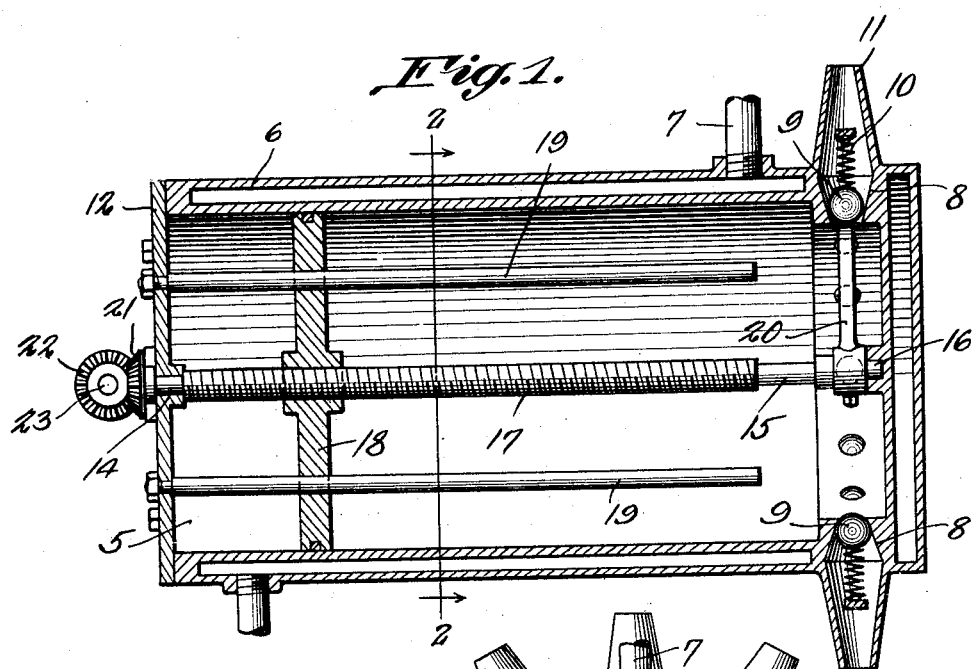
Figure 1 is a longitudinal sectional view through a lubricator.
Figure 2:
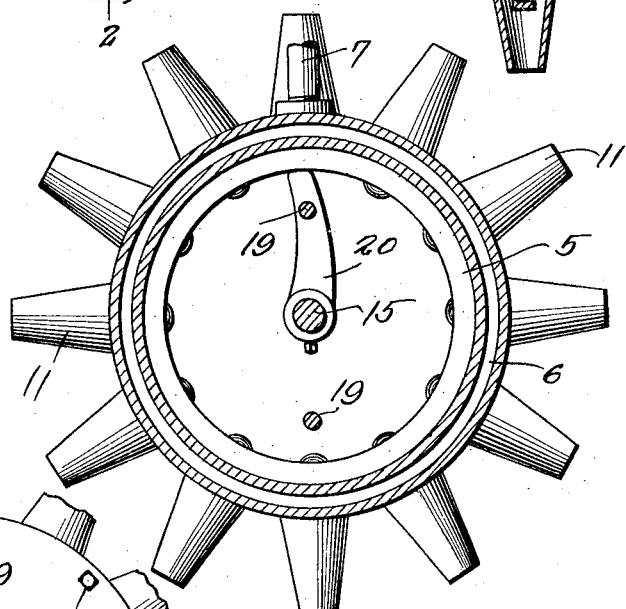
Figure 2 is a sectional view taken on line 2—2 of Figure 1.
Figure 3:
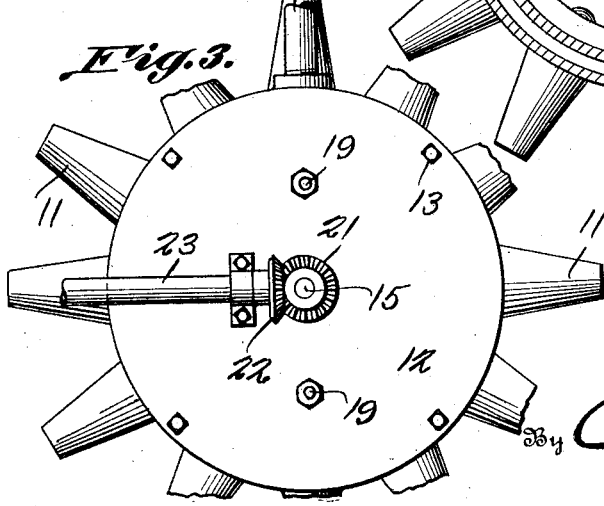
Figure 3 is an end elevational view of the lubricator.

Referring to the drawing in detail, the device includes a cylindrical body portion indicated generally by the reference character 5, the wall thereof being formed with a heating space 6 which is in communication with the exhaust pipe of a motor vehicle, through the pipe 7, so that the heat from the exhaust gases will act to partially soften the lubricant contained in the body portion, so that it will flow freely.

Openings are formed in the body portion adjacent to one end thereof, which openings are tapered, as indicated at 8, and define valve seats for the ball valves 9 which are normally urged to their seats by means of the coiled springs 10. Nozzles 11 extend from the body portion at points adjacent to the openings, to which nozzles pipes are secured, the pipes leading to various bearings of a motor vehicle, to be lubricated by the device.

The reference character 12 designates a removable closure for closing one end of the body portion, the closure being held in position by means of bolts 13. A bearing indicated at 14 is formed centrally of the closure 12 and accommodates the shaft 15 that has its inner end positioned in the bearing 16 formed at the opposite end of the body portion.

The shaft 15 is threaded, as shown at 17, the threads terminating in spaced relation with the inner end of the shaft 15 so that the follower, which is indicated at 18 will pass onto the smooth inner extremity of the shaft 15 where it will be held against further movement.

As clearly shown by Figure 1 of the drawing, the follower 18 is provided with a central threaded opening to accommodate the threaded portion of the shaft 15, so that rotary movement of the shaft 15 will act to feed the follower 18 to the opposite end of the body portion.

Openings are formed in the follower 18 and accommodate rods 19 that are secured to the cover or closure 12, so that rotary movement of the follower 18 will be prevented at all times.

At the inner end of the shaft 15 is a curved arm 20 that extends laterally to a point adjacent to the inner surface of the tubular body portion, so that it will contact with the ball valves 8 as it is rotated, with the result that the ball valves are forced from their seats and a quantity of lubricating material is forced from the body portion through the nozzles, and into pipes that feed the bearings, the pipes and bearings being omitted in the present showing.

A pinion indicated at 21 is secured to one end of the shaft 15 and extends beyond the closure 12, where it is engaged by the pinion 22 carried at one end of the shaft 23 which extends into the transmission housing of the motor vehicle equipped with the device, where it is supplied with a pinion to mesh with a pinion within the transmission, so that rotary motion is imparted to the shaft 15.

It might be further stated that the gearing is such that the shaft 15 will be rotated slowly to operate the arm 20 and cause it to unseat the valves while the pressure from the follower 18 will act to force the lubricating material from the cylindrical body portion.

While the invention has been shown and described for use in connection with a motor vehicle, it is to be understood that the device may be used at any place where it is desired to supply lubricating material to bearings or other working parts, and that the device may be operated with any suitable machinery such as a motor, or steam actuated gears.

It should also be understood that the follower may be forced through the body portion by the action of steam admitted to the body portion.

I claim:

1. A lubricator of the class described including a cylindrical body portion having a plurality of openings and having discharge nozzles at the openings, valves for controlling the passage of material through the nozzles, a threaded shaft operating in the body portion, an arm on the threaded shaft and adapted to engage the valves to unseat the valves, means for rotating the threaded shaft, and a follower on the threaded shaft for forcing material from the body portion.

2. A forced feed lubricator including a cylindrical body portion having a pluraliy of openings adjacent to one end thereof, said openings having inwardly inclined walls, ball valves operating in the openings to control the passage of material from the openings, a rotary arm within the body portion and adapted to contact with the valves to unseat the valves, means for forcing material from the openings, and means for heating the body portion to liquefy the lubricating material within the body portion.

3. In a lubricator, a body portion having a plurality of discharge openings arranged adjacent to one end thereof, valves for normally closing the discharge openings, a rotary shaft extending into the body portion, an arm extending laterally from the shaft and rotatable with the shaft, said valves lying in the path of travel of the outer end of the arm said arm acting to successively unseat the valves when the shaft is rotated to allow lubricating material to pass from the body portion.

In testimony that I claim the foregoing as my own, I have hereto affixed my signature.

EVERETT P. COLLINS.